(12) United States Patent
Giese

(10) Patent No.: US 9,486,874 B2
(45) Date of Patent: Nov. 8, 2016

(54) CONTROL ASSEMBLY FOR A WELDING GUN

(75) Inventor: William Richard Giese, Monee, IL (US)

(73) Assignee: Illinois Tool Works Inc., Glenview, IL (US)

( * ) Notice: Subject to any disclaimer, the term of this patent is extended or adjusted under 35 U.S.C. 154(b) by 2055 days.

(21) Appl. No.: 12/269,917

(22) Filed: Nov. 13, 2008

(65) Prior Publication Data

US 2009/0152254 A1    Jun. 18, 2009

Related U.S. Application Data

(60) Provisional application No. 61/013,095, filed on Dec. 12, 2007.

(51) Int. Cl.
     *B23K 9/10*          (2006.01)
     *B23K 9/28*          (2006.01)

(52) U.S. Cl.
     CPC ........ *B23K 9/287* (2013.01); *B23K 9/10* (2013.01)

(58) Field of Classification Search
     CPC ........................................... B23K 9/32
     USPC .......................... 219/137.31, 132
     See application file for complete search history.

(56) References Cited

U.S. PATENT DOCUMENTS

| | | | | |
|---|---|---|---|---|
| 4,250,366 A | * | 2/1981 | Erickson et al. | 200/332.2 |
| 4,270,824 A | * | 6/1981 | Erickson | 439/194 |
| 4,403,136 A | * | 9/1983 | Colman | 219/137.31 |
| 5,698,122 A | * | 12/1997 | Lubieniecki et al. | 219/137.31 |
| 5,869,801 A | * | 2/1999 | Paton et al. | 219/121.12 |
| 2005/0023263 A1 | * | 2/2005 | Blide | 219/132 |

FOREIGN PATENT DOCUMENTS

GB           2323431 A    *    9/1998          F23Q 3/00

\* cited by examiner

*Primary Examiner* — Dana Ross
*Assistant Examiner* — Ayub Maye
(74) *Attorney, Agent, or Firm* — Fildes & Outland, P.C.

(57) ABSTRACT

A welding gun includes a control switch combined with a trigger. The control switch features a slide movable to at least first and second positions. In an operating mode, the control switch switches between two differing sets of welding parameters in the first and second positions. In another operating mode, the control switch operates a safety lockout, allowing activation of the welding gun by the trigger in one position and preventing activation in the other position. For operator convenience, the control switch may be positioned to slide transversely relative to the wire passageway of the weld gun with which the trigger is generally aligned.

8 Claims, 3 Drawing Sheets

CONTROL ASSEMBLY FOR A WELDING GUN

CROSS REFERENCE TO RELATED APPLICATION

This application claims the priority of U.S. Provisional Application No. 61/013,095 filed Dec. 12, 2007.

TECHNICAL FIELD

This invention relates to welding systems, and more particularly to a procedure controlling switch for a welding gun.

BACKGROUND OF THE INVENTION

Welding is used in various manufacturing and construction applications to join various metal pieces together to form a unitary piece. An arc welding system typically includes an electric power supply coupled to a welding gun that houses an electrode that is located in the handle. The electrode completes an electrical circuit with a source of power when the electrode is placed against a piece of metal to be welded. The contact between the electrode and the piece of metal produces an electric arc between the electrode and the metal piece. The heat of the electric arc is concentrated on the metal piece, or pieces, to be joined, thereby melting the metal piece(s). A filler material is added to the molten metal, which subsequently cools and solidifies, joining the metal pieces together.

Metal Inert Gas (MIG) welding is one type of arc welding. MIG welding is also referred to as "wire feed" or Gas Metal Arc Welding (GMAW). In MIG welding a metal wire is used as the electrode to produce the arc. The wire is shielded by an inert gas and the metal wire acts as the filler for the weld. The inert gas is used to shield the electric arc from contaminants and gases that may react with the weld. Typically, the wire and gas are fed through a hand-held welding gun. The wire and gas are fed to the welding gun from a welding system having a wire feeder, a power source and a source of gas.

FIG. 1 illustrates a typical prior art welding gun 10. The welding gun typically includes a switch or trigger 12 that is coupled to the rest of the system. The welding gun includes a modular switch assembly 14 that is configured to be actuated by an operator's index finger. The switching mechanism inside the trigger is a conventional open/close contact mechanical switch, having a plurality of mechanical connections and moving parts. When the trigger is actuated, gas and wire are fed through the handle 16 and the curved delivery tube and nozzle 18, and power is applied to the welding wire, not shown.

Other types of welding, such as submerged arc welding, utilize wire guns that include switches or triggers. In submerged arc welding, a trigger is actuated to feed flux and wire through the welding gun. The triggers and switches of typical prior art welding guns include mechanical connections and moving parts, such as springs, stems or the like.

Various welding guns also include a trigger locking mechanism so that an operator does not have to constantly press the trigger in order to maintain activation. The locking mechanism is configured to allow for a quick release. Thus, when the operator is finished welding, the operator simply engages the quick release to finish activation.

SUMMARY OF THE INVENTION

The present invention provides a welding gun including a control switch that features a slide movable to at least first and second control positions. The control switch may be connected in various ways to control an operation of the welding gun upon activation of the switch or to provide a safety function that controls activation of a trigger of the welding gun itself.

In one operating mode, the control switch is connected to operate as a dual procedure switch that remotely switches the welding system between two sets of welding parameters. This may be accomplished by transverse movement of the slide relative to the orientation of the welding gun handle, which selects between the welding parameters available in the first and second switch positions for carrying out welding when the trigger is operated.

In another operating mode, the control switch may be wired as a safety lock-out, allowing activation of the gun by the trigger in one position and preventing activation of the gun in the other position. For operator control convenience, the control switch may be positioned to slide transversely relative to the handle and the wire passageway of the weld gun with which the trigger is generally aligned.

These and other features and advantages of the invention will be more fully understood from the following detailed description of the invention taken together with the accompanying drawings.

DETAILED DESCRIPTION OF THE INVENTION

Figure 1:
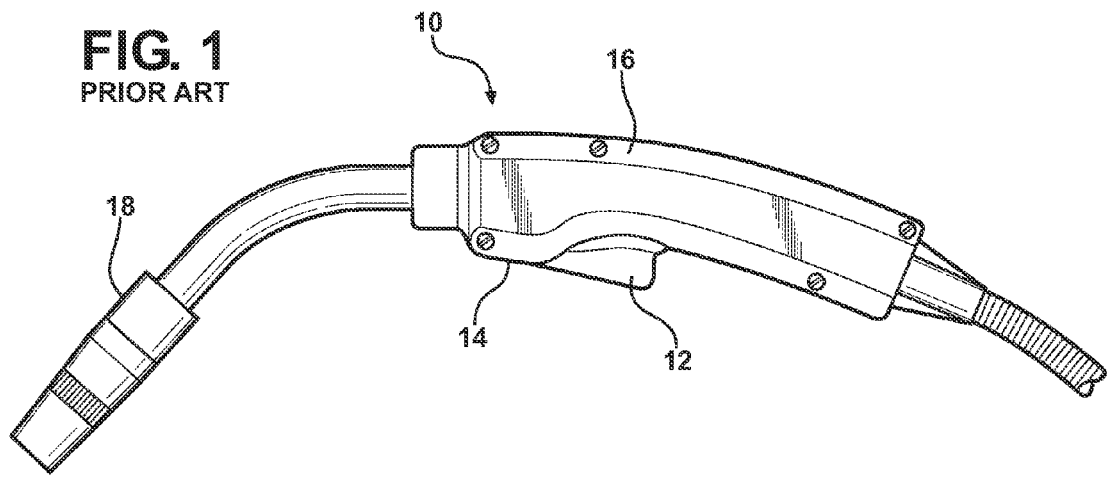
FIG. 1 is a schematic view of a typical prior art welding gun having a longitudinally aligned trigger.
Figure 2:
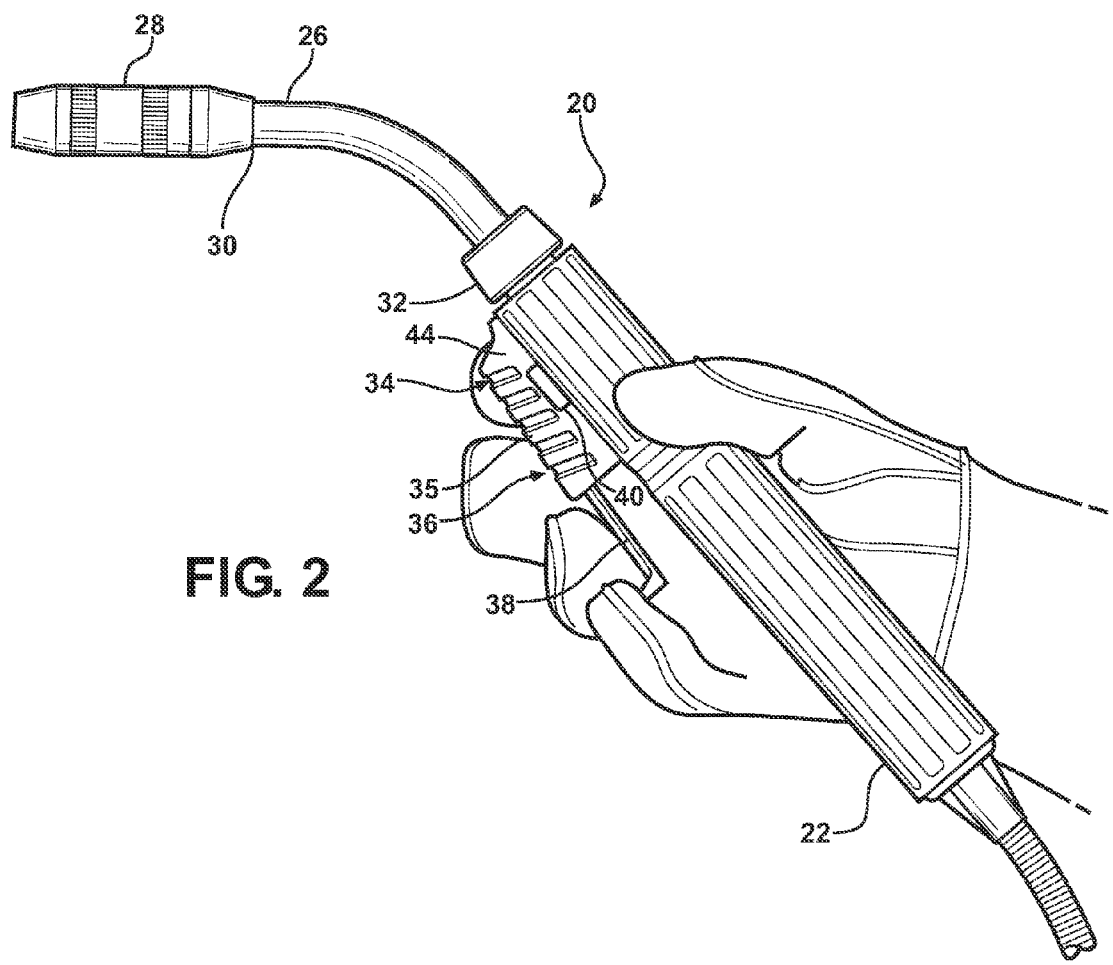
FIG. 2 is a pictorial view of a welding gun of the invention having a control switch assembly held for operation below the welding gun handle.
Figure 3:
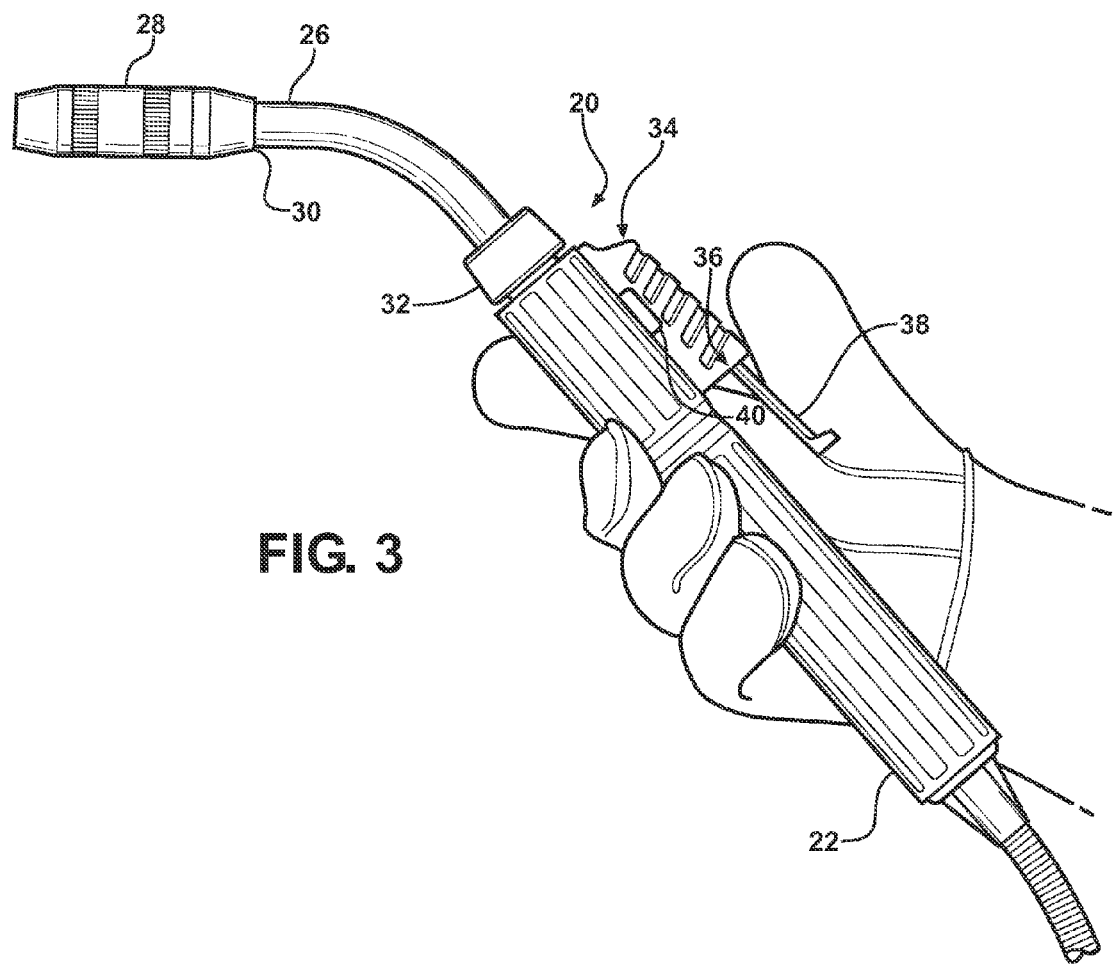
FIG. 3 is a view similar to FIG. 2 of a similar welding gun having a control switch assembly held for operation above the welding gun handle.

Referring now to FIGS. 2 and 3 of the drawings, numeral 20 generally indicates a welding gun according to the present invention. Welding gun 20 may be arranged to be held in various positions for welding of metal workpieces. Each figure shows a welding gun 20 having a handle 22, a gooseneck 26 and a contact tip 28 at a distal end 30 of the gooseneck. A cap 32 retains the gooseneck 26 on the handle but may be loosened to allow rotation thereof to any direction convenient for welding of various workpieces.

Figure 4:
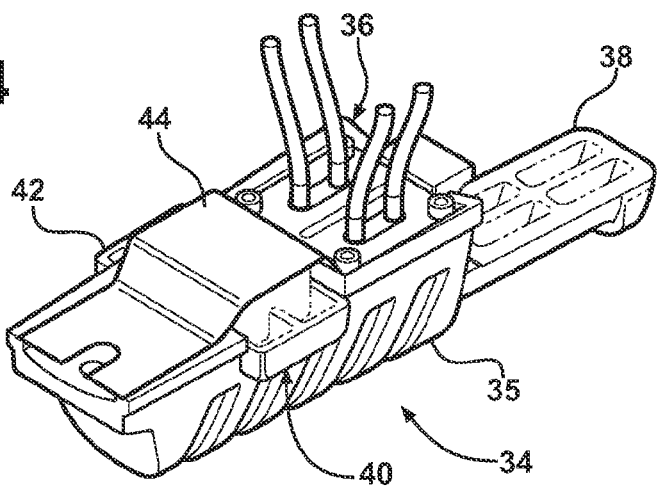
FIG. 4 is an isometric view from the top and side of a control switch assembly of the invention.
Figure 5:
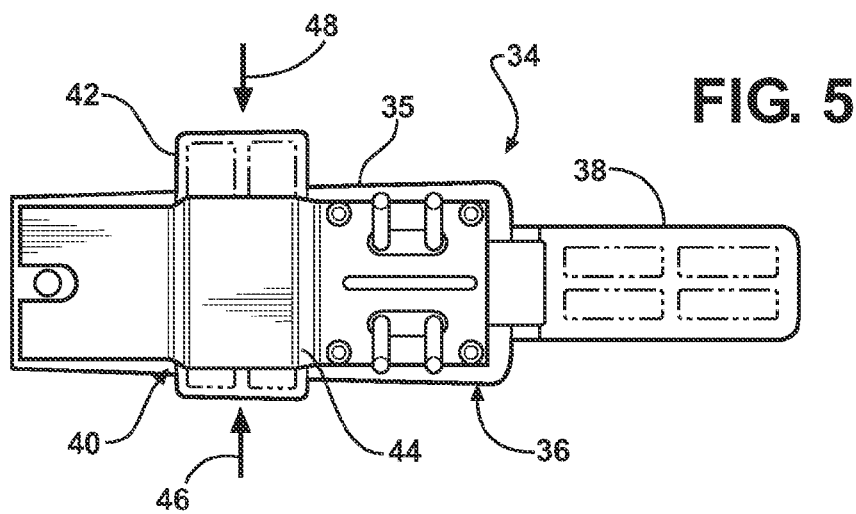
FIG. 5 is top view of the control switch assembly of FIG. 4.
Figure 6:
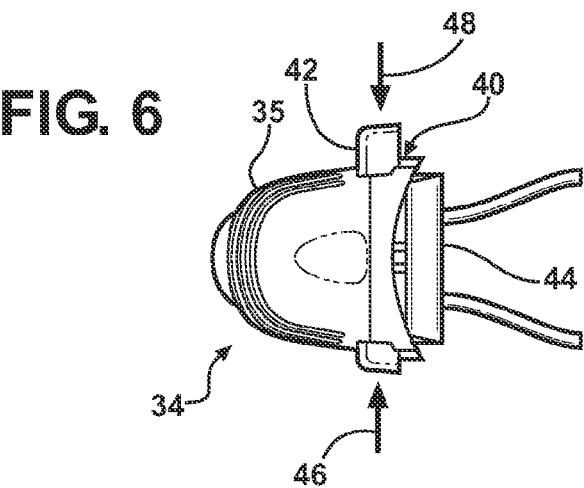
FIG. 6 is a front view of the control switch assembly of FIGS. 4 and 5.

Each figure shows an assembly 34 mounted near the front of the handle 22. Each assembly 34 includes a switch body 35 carrying a 36 with an actuator lever 38, generally aligned with the handle 22, and a control switch 40 including (see FIGS. 4-6) a slide 42 retained by a cover 44 and forming a switch transversely movable in the switch body 35.

In FIG. 2, the assembly 34 is mounted on the lower side of the handle 22 with the gooseneck 26 angled down. A gloved hand of an operator is shown holding the handle 16 in an upright position to operate the trigger and control switch 40 on the lower side of the handle 22.

In FIG. 3, the same welding gun 20 is shown with the handle 22 inverted so that the assembly 34 is on the top. The gooseneck 26 has been again turned down by loosening the retaining cap 32 and rotating the gooseneck relative to the handle. In this position, the gloved hand is again in position to operate the trigger and control switch 34 now being held on top of the handle 22.

The foregoing is exemplary of the arrangements which are provided by the welding gun 20 having a handle 22 which may be connected with a source of power and to a welding wire feed and a supply of inert gas, not shown, for MIG or submerged arc welding.

Referring to FIGS. 2-6 assembly 34 may be of modular construction mounted on the handle 22. Assembly 34 includes a switch body 35 enclosing a trigger 36 with a positioning lever 38 that may be positioned to be easily actuated by an index finger of an operator. In accordance with the invention, the control switch 40 may be mounted on the switch body 35 or on the handle 22 adjacent to the switch body 35. The control switch 40 is operatively connected with the trigger 36 and includes a slide 42 movable between first and second positions but shown in the first position. The slide movement to first and second positions is indicated by arrows 46, 48, respectively, in FIGS. 5 and 6. In these positions, the control switch 40 may be operative to control, respectively, the function or activation of the operator actuated trigger 36 of the hand-held welding gun 20.

The welding gun 20 may be operable for MIG welding, submerged-arc welding or other suitable welding operations. The control switch 40 may be connected in a first operating mode as a dual procedure switch operative to remotely switch the welding system between two sets of welding parameters. In a second operating mode, the control switch 40 may be wired in series with a main trigger on/off circuit, which serves as a safety lock-out to prevent unintended activation of the trigger function. Such a safety is an important feature in industrial applications such as shipyards.

As indicated, the control switch 40 includes a slide 42 positioned to move laterally within the cover 44 of the switch body 35 wherein the slide 42 is moved generally transverse to the direction of the wire passageway in the handle 22 of an associated welding gun 20. The control switch 40 may be of simple construction having the slide 42, carrying, for example, a bridging contact, not shown, movable between dual connector contacts in laterally spaced positions in the control switch 40, with detents, not shown, to maintain the switch in either selected position. If desired, the control switch 40 could be positioned in any desired orientation so that the slide 42 could move in other directions than transverse to the axis of the wire passageway.

Thus, the present invention provides a sliding control switch having simple construction and which may be positioned for sliding in a transverse or other desired direction relative to the handle or wire passageway of an associated welding gun. In contrast to conventional welding guns, an operator does not have to constantly depress the trigger or use a locking mechanism. Additionally, if an apparatus according to the present invention is accidentally dropped, the trigger or active touch switch is not accidentally activated, unlike typical mechanical switches.

Although the invention has been described by reference to a specific embodiment, it should be understood that numerous changes may be made within the spirit and scope of the inventive concepts described. Accordingly, it is intended that the invention not be limited to the described embodiment, but that it have the full scope defined by the language of the following claims.

What is claimed is:

1. A control assembly for a welding gun including a handle, gooseneck and contact tip, said welding gun delivering at least one of electric power, welding wire and inert gas to a welding site for welding, said assembly comprising:
   a switch body disposed along a longitudinal axis of the handle;
   said switch body enclosing a trigger with a positioning lever pivotally mounted on the handle for movement toward and away from the handle for gun activation; and
   a control switch mounted on said switch body or on said handle adjacent said switch body and having a slide reciprocably, linearly movable relative to the body and operative to select a procedure of the welding gun, the slide being movable between two positions along an axis radially disposed and generally transverse to a longitudinal axis of the body such that the control switch is pushable between said two positions in either direction along said transverse axis, and operation of the control switch is transverse to operation of the trigger.

2. An assembly as in claim 1 wherein the trigger includes a lever extending from an end of the body, the lever being pivotable about an axis generally transverse to the longitudinal axis of the body.

3. An assembly as in claim 1 wherein the slide is slidably movable between two positions to select between two sets of gun operating conditions.

4. An assembly as in claim 1 wherein the slide is slidably movable between two positions alternatively allowing and preventing gun operation by the trigger.

5. A welding gun as in claim 1 wherein the control switch is moveable between first and second positions to respectively prevent and allow gun operation by the trigger.

6. A welding gun for controlling delivery of welding materials including at least one of electric power, welding wire and inert gas to a welding site for welding of metals, the welding gun including a handle with a generally longitudinally extending wire passageway;
   a switch body mounted on the handle and longitudinally aligned with the longitudinally extending wire passageway;
   said switch body enclosing a trigger with a positioning lever pivotally mounted on the handle for movement toward and away from the handle for gun activation; and
   a control switch mounted on said switch body or on said handle adjacent said switch body and having a slide reciprocably, linearly movable relative to the body and operative as a control switch to select a procedure of the welding gun, the control switch slide being slidable between two positions in directions radially disposed and generally transverse to the longitudinal direction of the wire passageway such that the control switch is pushable between said two positions in either direction along said transverse axis, and operation of the control switch is transverse to operation of the trigger.

7. A welding gun as in claim 6 wherein the switch body further includes a trigger including an activating lever pivotally movable on an axis generally parallel to the direction of motion of the control switch slide, the control switch being connected to selectively modify an operating mode of the trigger.

8. A welding gun as in claim 7 wherein the control switch is connected to switch the mode of welding procedures activated by the trigger between alternative procedures.

\* \* \* \* \*